United States Patent [19]

Miller et al.

[11] Patent Number: 4,610,700

[45] Date of Patent: Sep. 9, 1986

[54] ADSORBENT COMPOSITION USEFUL IN RETARDING CORROSION IN MUFFLERS

[75] Inventors: William C. Miller, Katonah, N.Y.; Stephen R. Dunne, Danbury, Conn.; Joseph P. Ausikaitis, Briarcliffe Manor, N.Y.

[73] Assignee: Union Carbide Corporation, Danbury, Conn.

[21] Appl. No.: 657,594

[22] Filed: Oct. 4, 1984

Related U.S. Application Data

[63] Continuation-in-part of Ser. No. 548,578, Nov. 4, 1983.

[51] Int. Cl.$^4$ ............................................. B01D 53/04
[52] U.S. Cl. ........................................ 55/35; 55/75; 55/389; 181/245; 502/67; 502/72
[58] Field of Search ............... 55/33, 31, 35, 75, 389; 208/135, 310 Z; 502/67, 79; 181/244–246

[56] References Cited

U.S. PATENT DOCUMENTS 3,067,002 12/1962 Reid, Jr. ............................ 423/212
3,618,314 11/1971 Krebs .............................. 55/389 X Primary Examiner—Robert Spitzer
Attorney, Agent, or Firm—Richard G. Miller

[57] ABSTRACT

The internal corrosion of metal mufflers used in conjunction with internal combustion engines is substantially retarded by maintaining in the external void space thereof an adsorbent mass of a combination of crystalline zeolites having the crystal structure of chabazite and the crystal structure of faujasite. These adsorbent compositions exhibit a synergistic effect on corrosion retardation. Novel muffler devices per se are also disclosed.

12 Claims, 4 Drawing Figures

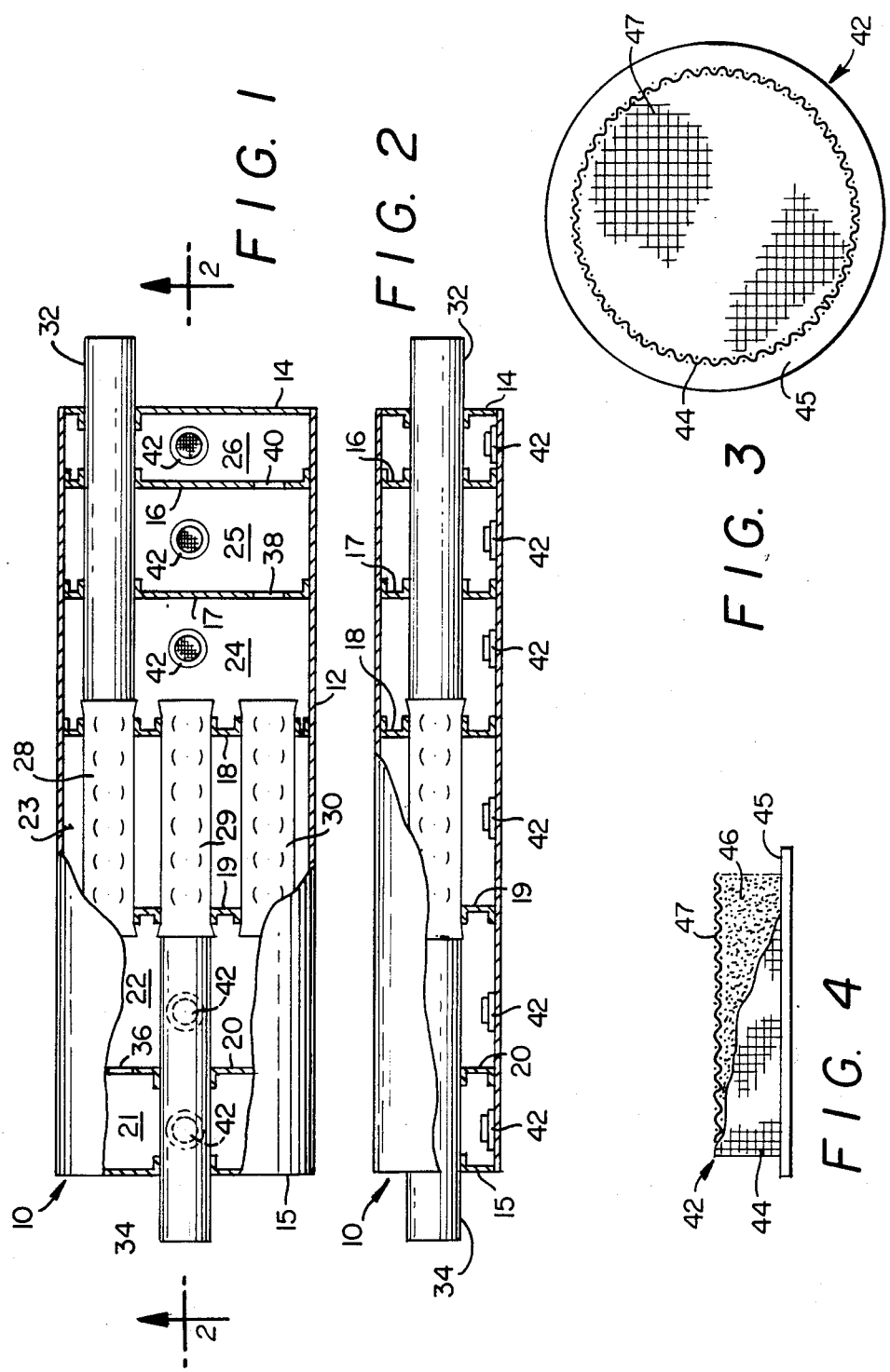

ADSORBENT COMPOSITION USEFUL IN RETARDING CORROSION IN MUFFLERS

The present invention relates in general to adsorbent compositions, and more particularly to mixtures of crystalline zeolitic molecular sieves which exhibit a synergistic effect with respect to the ability to maintain the internal space of automobile mufflers free of condensed water vapor. The invention also relates to mufflers containing such adsorbent compositions and to the use of such materials in inhibiting the corrosion of exposed internal metal surfaces of mufflers used in conjunction with internal combustion engines.

Corrosion and resultant failure of mufflers is primarily due to two corrosion mechanisms. Stress corrosion is caused by vibration, applied stress, and chemical action without loss of metal. Failure is typified by cracking initiated by pitting. Cracking can occur near non-stress relieved welds and corrosion fatigue may result under dynamic or altering stress conditions in a corrosive environment. Chemical corrosion or general corrosion is caused by fairly uniform thinning and loss of metal not accompanied by localized action such as pitting and cracking. The corrosiveness of the environment can be decreased by reducing or changing temperature, pressure, velocity, and/or composition. In conventional automotive systems there is not a very great degree of freedom to significantly alter these parameters since the optimum performance of the internal combustion engine involved is far more critical than the life of the muffler system.

It has heretofore been proposed to utilize adsorbents such as crystalline zeolites in automotive exhaust systems as in U.S. Pat. No. 3,067,002 (Reid, Jr.) wherein natural or synthetic alkali or alkaline earth metal aluminosilicates are effective for sorbing uncombusted hydrocarbons. During engine warm-up periods hydrocarbons are first adsorbed and then are desorbed when the exhaust gas temperature and the catalyst become hot enough to fully combust these hydrocarbons. In order for an adsorbent to be effective for hydrocarbon adsorption, the presence of moisture would have to be avoided when using hydrophilic zeolites. A non-combustible hydrophobic (organophilic) adsorbent would be a preferred product in the Reid Process. Krebs, et al. U.S. Pat. No. 3,618,314) specify NaX molecular sieve to be effective for filtering out carbonaceous particulate matter by incorporating the adsorbent in chambers or baffles.

It has also been proposed that the adsorbent properties of crystalline zeolites, and activated alumina can be utilized in an essentially non-catalytic manner to alter the chemical composition of the corrosive environment periodically contained within a muffler section of an exhaust system, and thus significantly increase the life of the metal parts thereof in direct contact with the corrosive materials. Such a proposal is contained in U.S. Pat. No. 4,402,714, wherein there is described the process which comprises placing an adsorbent mass, preferably of crystalline zeolitic molecular sieve, in the internal space thereof, in sufficient amounts to prevent condensation of water vapor from the engine exhaust gases on the walls thereof after engine shut down. This procedure significantly inhibits corrosion of the metal parts. The patent further describes as preferred zeolite adsorbent masses those having pore sizes of at least 3.2 angstroms, a surface area of at least 350 m²/gm, a molar $SiO_2/Al_2O_3$ ratio of from 4 to 20 and a water adsorption capacity at 100° C. and water vapor pressure of 80 mm. Hg of at least 4 weight percent based on the anhydrous weight of the zeolite. Specific zeolites within this class include naturally occurring and synthesized zeolites such as mordenite, chabazite, erionite, clinoptilolite, zeolite Y, zeolite omega, ZSM-5, ZSM-11, ZSM-12, zeolite beta, zeolite T, and zeolite L. Activated alumina was also said to yield similar results.

It is, therefore a general object of the present invention to provide improved adsorbent compositions for inhibiting corrosion of internal metal surfaces of mufflers, and to improve corrosion-resistant muffler devices utilizing such improved adsorbent compositions.

These and other objects and advantages will be more apparent from the following detailed description and drawings, wherein:

FIG. 1 is a plan view of a typical muffler containing a zeolite adsorbent composition in accordance with one embodiment of the present invention, the housing being partially broken away;

FIG. 2 is a side elevational view of the muffler of FIG. 1 with the housing being partially broken away, and taken as illustrated substantially along lines 2—2 of FIG. 1.

FIG. 3 is a fragmentary plan view of one of the insert adsorbent-containing tubes on an enlarged scale; and FIG. 4 is a side elevational view of one of the insert tubes of FIG. 3 with the housing partially broken away.

Particularly with respect to FIG. 1 of the drawings, one embodiment of a muffler device of the present invention is indicated generally at 10. Muffler 10 comprises an elliptical metallic casing 12 having end walls 14 and 15, and internal baffles or partitions 16, 17, 18, 19 and 20, which divide the internal muffler space into chambers 21, 22, 23, 24, 25 and 26. Three perforated tubes 28, 29 and 30 are supported within partitions 18 and 19. Inlet tube 32, supported by partitions 16 and 17 and end wall 14 communicates with perforated tube 28. Outlet tube 34 supported by partition 20 and end wall 15 communicates with perforated tube 29 and extends out of the casing therefrom. Partition 20 has an opening 36 aligned with perforated tube 28 to interconnect chambers 21 and 22, and partitions 17 and 16 have openings 38 and 40, respectively, aligned with perforated tube 30 to interconnect chambers 24, 25 and 26. Engine exhaust gases entering inlet tube 32 are passed through perforated tube 28 and the gas stream is divided and redivided by the perforated tube and chamber system so that various portion thereof travel various distances within the muffler before leaving through exit tube 34. Each of chambers 21, 22, 23, 24 25 and 26 contains attached to the casing wall an adsorbent-containing cup 42, shown in greater detail in FIG. 3 and FIG. 4.

With respect to FIG. 4, adsorbent containing cup 42 comprises a cylindrical metal mesh side-wall 44 sealed to metal disc 45, the latter serving to attach the adsorbent-containing assembly to the casing wall by any convenient means such as spot welding, riveting and the like. The adsorbent particles 46 are retained in the cup 42 by means of a covering metal mesh 47 which permits ready contact of the adsorbent particles with the gases within the muffler.

The improved adsorbent compositions provided in accordance with the present invention comprise a combination of a crystalline zeolite having the chabazite crystal structure with a crystalline zeolite having a faujasite crystal structure. This combination of zeolites when utilized in the aforesaid mufflers to accomplish the process of this invention exhibits an unexpected synergism in reducing the amount of muffler corrosion.

The mineral chabazite (also heretofore denominated Acadialite, Haydenite, Phacolite and Glottalite) is a widely-occurring zeolite found in Ireland, Nova Scotia and Colorado, USA, among other places and has a typical unit cell content of $Ca_2[(AlO_2)_4(SiO_2)_8] \cdot 13 H_2O$. It is the preferred chabazite-type zeolite for use in the present invention. Synthetic forms of the chabazite-type structure are also known, notably Zeolite D, whose synthesis and structure are described in detail in British Pat. No. 868,846, (1961).

The faujasite-type of crystalline zeolite is represented principally by the well-known synthetic Zeolite X and Zeolite Y. At present no significant deposits of the mineral faujasite are known to exist. Zeolite X has a maximum molar $SiO_2/Al_2O_3$ ratio of 3, and accordingly does not possess a very substantial resistance toward structural degradation by acid attack. Zeolite Y and its myriad of modified forms can have molar $SiO_2/Al_2O_3$ ratios of greater than 3 up to several hundred. Preferably a zeolite Y having a molar $SiO_2/Al_2O_3$ ratio of from 4 to 20 is employed in the present invention.

The synergistic effect of the combination of chabazite-type and faujasite-type of zeolites in inhibiting muffler corrosion is evidenced in mixtures of the two in all proportions, but is more significantly exhibited. and hence preferred, when one of the zeolite types is present in an amount of from $\frac{1}{3}$ to 3 times the other zeolite type on an anhydrous weight basic. As used herein the anhydrous weight of a zeolite constituent is arbitrarily defined as the weight of the zeolite after being calcined in vacuo at 300° C. for 3 hours. More preferably the combined chabazite-type and faujasite-type zeolites constitute at least about 70 weight % of the overall adsorbent-containing mass inserted into the inner cavity of the muffler. The remaining 30 weight percent of the mass can comprise any of several of the known zeolite binder materials such as clays, alumina or silicas. Granular, extruded, beaded or other monolithic forms of the adsorbent mass are preferred to powder because of the high local gas stream velocities through the muffler which may fluidize the particles and carry them out of the exhaust system.

Of the various cation forms in which the present zeolite materials can exist. it is preferred that in the faujasite-type zeolite, at least about 50 percent of the $AlO_4$ framework tetrahedra be associated with sodium cations, and that at least about 50 percent of the $AlO_4$ tetrahedra of the chabazite-type zeolite be associated with sodium cations or calcium cations or a combination of these two cation species.

While it is preferred that both types of zeolite employed in this invention be combined into the same adsorbent mass, it will be obvious to those of even routine skill in the art that a number of different arrangements are possible which achieve the desired results and are within the true scope of this invention. For example the crystals of both zeolite types can be contained, more or less homogeneously within the same bound particle and a number of such particles combined or aggregated into the overall adsorbent mass. Also crystals of each zeolite species can separately be formed, with or without added binder material, into particles, which are then admixed, and optionally agglomerated into one or more larger entities. Further, agglomerates of crystals of one zeolite species can be admixed with crystallites (powder) of the other species and formed into one or more larger adsorbent masses. A number of isolated adsorbent masses can be located in various sites within the muffler. When positioned within an automobile muffler, the differential (working) capacity for water of the adsorbent mass is achieved because the mass is regenerated "in situ" by the changing conditions. Regeneration (desorption) is achieved as the engine is running and temperature of the exhaust gases increase rapidly while the temperature of the metal exhaust system increases slowly because of the thermal sink. Thus a preferred location for an adsorbent mass for regeneration would be in the proximity of the hot exhaust gas and not in a remote position such that the adsorbent mass would behave like a thermal sink. Although the water content of the exhaust gas is high (10 volume percent), the relative saturation of this gas at 600° to 800° F. is low and the adsorbent mass has a low equilibrium water loading; therefore, desorption must occur. Desorbing water is swept out of the exhaust system by the following exhaust gases. Adsorption occurs when the engine is shut off and the flow of exhaust gas stops and the entire exhaust system begins to cool to ambient temperatures. As the exhaust gas cools, the relative saturation of the gas increases for constant water content (dew point) and the adsorbent mass will have a higher equilibrium loading. Because the adsorbent mass can be considered an insulator compared to the metal walls of the muffler, this places specific demands on the adsorbent mass. The adsorbent mass must adsorb water vapor before the metal cools below the dew point of the exhaust gas. Accordingly, the quantity of adsorbent needed is that amount which prevents water condensation at all times, within the muffler chamber. This represents a total zeolite requirement of 2 to 13 grams for each 1,000 cubic inch of muffler volume. Additional adsorbent is, of course, required to accommodate for aging and consequent reduction of its adsorption properties.

The manner of positioning the adsorbent in the muffler's internal space is not a factor critical to the present invention. It is of obvious importance that all of the internal space is in good communication with the adsorbent, and that the adsorbent remains in the muffler despite the tendency to be ejected by the force of the exhaust gases passing therethrough. A muffler generally consists of a singular external housing containing several internal chambers with interconnecting pipes. The chambers are created by means of internal metal bulkheads which position and support the internal piping network. Since the flow of exhaust gases is not necessarily constant, or even continuous, through all the chambers, it cannot be assumed that the exhaust gases are well mixed within a muffler. Therefore, it is preferred to distribute the adsorbent material among all the internal chambers of the muffler.

Independent containment devices such as tubes, pillows, bags and packets can be fabricated of thermally stable, permeable material, each device containing a small quantity (1 to 50 grams) of adsorbent. These devises can then be placed into each chamber during the manufacturing step. These devices could be loose or fixed into position by means of a clip, spot weld or pop rivet without requiring any significant alteration of existing manufacturing procedures. Assembled mufflers can also be retrofitted with adsorbent by inserting these devices into at least two chambers via the exhaust and tail pipe connections.

Integral containment devices can also be used, but may require a change in existing designs and manufacturing procedures. These devices can consist of means for immobilizing the adsorbent in perforated metal boxes, between screens and bulkheads, or in expanded metal components. Adsorbent can also be sandwiched between the internal and external shells which constitute the external housing, with the internal shell having performations to allow the adsorbent to contact the gas.

Coatings of tubes, bulkheads and/or internal surfaces with adsorbent is also feasible. Simulated coatings can be accomplished with an adsorbent loaded material or heat-resistant tape. Actual slip coatings made of silica-rich slurries of adsorbent powder can also be used to coat surfaces. Such a slurry can be used to dip, spray. or otherwise cover any surface. The coating is hardened by heating the part to about 200° C. either during production or on the vehicle.

The present invention and the improvements it provides are illustrated by the following example:

EXAMPLE 1

Fifty-four (54) passenger cars were fitted with new mufflers. Each muffler was fitted with a trap door on the bottom to allow access to the internal chambers. Each muffler except for controls contained 50 grams of an adsorbent mass contained in fine wire mesh bags. In addition all mufflers contained six (6) corrosion test coupons fabricated from the same metal stock used in the manufacture of the same mufflers. Three (3) coupons were affixed in the central core region near the multipass gas pipes. Corrosion rates measured here will be subsequently referred to as position "B" corrosion rates. The remaining three (3) coupons were affixed to the lower internal housing wall where any condensate would be expected to collect. Corrosion rates measured here will be subsequently referred to as position "A" corrosion rates. A corrosion coupon was taken from each position at three intervals during a total test period which lasted somewhat less than one year. The retrieved coupons were cleaned, pretreated, and weighed with a systematic procedure. The weight loss due to metal thinning caused by corrosion was determined by subtracting the coupon weight from its original recorded weight before it was placed into the muffler's corrosive environment. The corrosion rate was calculated by dividing the weight loss by the number of days that the coupon was in the muffler and expressing this rate in terms of a reduction in thickness in units of mils per year. Not all adsorbent masses were tested in the same number of vehicles and some coupons were lost during the test. In addition, various makes and models were used with each having its own unique driving history. All cars were originally equipped with catalytic converters of variable and unknown activity and/or performance. The engines of all of the test cars had either 4 or 6 cylinders and were used primarily as short range (<50 miles/day) commuter passenger cars. The latter category of vehicles were suspected to yield the highest corrosion rates. In view of the aforementioned uncontrollable variables, conventional statistical analysis was applied to the raw test data. All of the corrosion rate data was analyzed both by adsorbent mass treatment type and as a combined aggregate of data. A regression analysis of the aggregate was done versus the previously mentioned uncontrollable variables. This was done in order to determine if any treatment type was inadvertently biased by having low or high corrosion rates due to vehicle's type, vehicle age, vehicle mileage, test mileage driven, cylinders, and internal muffler volume. There was found to be a small but significant correlation against vehicle age and against, the somewhat redundant variable, vehicle mileage. Thus each corrosion data point was adjusted by the covariant vehicle age using the defined regression fit of the data. Therefore, only adjusted unbiased data is shown in the following table:

CORROSION RATE DATA - EXAMPLE 1
(Both Position "A" and "B")

| No. | Treatment Type | No. of Samples | Relative Mean Corrosion Rate | Standard Deviation (Mils/Yr) | Type n vs. 4 "t"-Statistic/P > $\|t\|$** | Type n vs. 3 "t"-Statistic/P > $\|t\|$** |
|---|---|---|---|---|---|---|
| 1. | NaY | 39 | 0.606 | 3.62 | 1.876/0.066 | 0.526/0.600 |
| 2. | Chabazite | 47 | 0.727 | 3.02 | 1.336/0.11 | 0.874/0.375 |
| 3. | 50/50 NaY/ Chabazite | 17 | 0.431 | 1.00 | 2.268/0.04 | — |
| 4. | Control (No adsorbent) | 78 | 1.00* | 2.88 | — | 2.268/0.04 |

*Absolute value > 2.495 mils/yr "A" Position
**Two sided or tailed probability

The corrosion rate data in the above table is presented in terms of relative means. That is, the mean corrosion rate observed for 39 determinations with treatment type 1, zeolite type NaY, was 60% of the mean corrosion rate observed for 78 determinations with control. The confidence levels associated with the relative reduction in corrosion rate versus controls (Type n vs. 4) is given as the "t-statistic" and the associated probability of the hypothesis being incorrect. For treatment type 1, there is only 6.6% chance that the determinations for NaY and treatment type 4 come from the same population. In other words, the confidence level associated with resultant relative mean corrosion rates is 93.4%. If only directional improvement is considered then a single-sided or one-tailed probability would result in a confidence level of 96.7% (1-0.5×P×$|t|$). In the table of corrosion rate data treatments types 1 and 2 were combined in a mixture of approximately 50 wt% of each zeolite type with appropriate quantities of binder. While treatment types 1, 2 and 3 all demonstrated significant reduction in corrosion rates versus controls, treatment type 3 provided the lowest overall corrosion rate. It is not obvious or expected after analyzing the final results that combining treatment type 1 with 2 would result in any improvement. In fact, one would anticipate that the combination would make a good treatment (type 1) less effective (directionally towards type 2), since all testing was run in parallel there was no way to anticipate this unexpected interaction. The confidence in the difference between the relative mean corrosion rates between the individual treatments, type 1 and type 2 versus type 3 (type n vs. 3) is also given in the table. Because the means are closer to each other, the confidence in the conclusions is reduced. Thus, one is only 40% and 63.5% confident that treatment types 1 and 2, respectively, are different from type 3. Considering type 3 as only an improvement, then one is 70% and 82.5% confident (single-sided) of an improvement. Even if treatment types 1 and 3 are essentially the same, there is reasonable confidence that treatment type 2 is worse and the directional improvement is therefore unexpected.

As a further advantage, it is found that bonded chabazite has excellent physical integrity and thus is resistant towards the thermal and physical abuse received in the muffler under conditions of normal operation of the vehicle. The blend of the less expensive mineral species with the more expensive synthetic species (type Y zeolite) is also economically attractive.

We claim:

1. Method for inhibiting the corrosion of metal parts of a muffler used in conjunction with an internal combustion engine which comprises maintaining in the internal space of said muffler an adsorbent mass comprising a mixture of a crystalline zeolitic aluminosilicate having the chabazite crystal structure and a zeolitic aluminosilicate having the faujasite crystal structure, said adsorbent mass being in contact with any gases entering said muffler from the internal combustion engine and the ambient atmosphere.

2. Method according to claim 1 wherein the zeolitic aluminosilicate having the chabazite crystal structure is a mineral chabazite and the zeolitic aluminosilicate having the faujasite crystal structure is a type-Y zeolite having a molar $SiO_2/Al_2O_3$ ratio of from about 4 to about 20.

3. Method according to claim 2 wherein the zeolitic adsorbent is employed in an amount of from about 2 to about 100 grams per 1,000 cubic inches of internal muffler void space.

4. Method according to claim 2 wherein the zeolitic aluminosilicate having the chabazite crystal structure is present in an amount of from $\frac{1}{3}$ to 3 times, on an anhydrous weight basis, the amount of zeolitic aluminosilicate having the faujasite crystal structure.

5. Method according to claim 2 wherein at least about 50 percent of the $AlO_4$ framework tetrahedra of the type-Y zeolite are associated with sodium cations, and at least about 50 percent of the $AlO_4$ framework tetrahedra of the mineral chabazite are associated with sodium cations or calcium cations or a mixture thereof.

6. Method according to claim 4 wherein the zeolitic aluminosilicates comprise at least 70 percent, anhydrous weight basis, of the overall adsorbent mass, the residue consisting essentially of an inorganic binder material.

7. An exhaust muffler for an internal combustion engine comprising a metal casing through which exhaust gases are adapted to flow, said casing having an exhaust gas inlet and an outlet, and an adsorbent mass comprising a mixture of a crystalline aluminosilicate having the chabazite crystal structure and a zeolitic aluminosilicate having the faujasite crystal structure, said adsorbent mass being in contact with and gases entering said casing from the internal combustion engine and the ambient atmosphere.

8. Muffler device according to claim 7 wherein the zeolitic aluminosilicate having the chabazite crystal structure is a mineral chabazite and the zeolitic aluminosilicate having the faujasite crystal structure is a type-Y zeolite having a molar $SiO_2/Al_2O_3$ ratio of from about 4 to about 20.

9. Muffler device according to claim 8 wherein the zeolitic adsorbent materials are present in an amount of from about 2 to about 50 grams per 1,000 cubic inches of internal muffler void space.

10. Muffler device according to claim 8 wherein the zeolitic aluminosilicate having the chabazite crystal structure is present in an amount of from $\frac{1}{3}$ to 3 times, on an anhydrous weight basis, the amount of zeolitic aluminosilicate having the faujasite crystal structure.

11. Muffler device according to claim 8 wherein at least about 50 percent of the $AlO_4$ framework tetrahedra of the type-Y zeolite are associated with sodium cations, and at least about 50 percent of the $AlO_4$ framework tetrahedra of the mineral chabazite are associated with sodium cations or calcium cations or a mixture thereof.

12. Muffler device according to claim 10 wherein the zeolitic aluminosilicates comprise at least 70 percent, anhydrous weight basis, of the overall adsorbent mass, the residue consisting essentially of an inorganic binder material.

* * * * *